(12) United States Patent
Hou et al.

(10) Patent No.: US 10,733,411 B2
(45) Date of Patent: Aug. 4, 2020

(54) OPTICAL BIOMETRIC IDENTIFICATION MODULE, DISPLAY APPARATUS, AND ELECTRONIC DEVICE

(71) Applicant: SHENZHEN GOODIX TECHOLOGY CO., LTD., Shenzhen, Guangdong (CN)

(72) Inventors: Lyu Hou, Guangdong (CN); Xiangying Liu, Guangdong (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 66 days.

(21) Appl. No.: 16/168,263

(22) Filed: Oct. 23, 2018

(65) Prior Publication Data
US 2019/0057239 A1 Feb. 21, 2019

Related U.S. Application Data

(63) Continuation of application No. PCT/CN2017/088165, filed on Jun. 13, 2017.

(51) Int. Cl.
*G06K 9/00* (2006.01)
*G06K 9/20* (2006.01)
(Continued)

(52) U.S. Cl.
CPC ....... *G06K 9/0004* (2013.01); *G06K 9/00046* (2013.01); *G06K 9/2027* (2013.01); *G06K 9/22* (2013.01); *G06F 3/041* (2013.01)

(58) Field of Classification Search
None
See application file for complete search history.

(56) References Cited

U.S. PATENT DOCUMENTS

| 5,365,481 A | 11/1994 | Sawada |
| 2010/0207890 A1 | 8/2010 | Chen |

(Continued)

FOREIGN PATENT DOCUMENTS

| CN | 2002117393 A | 4/2002 |
| CN | 101419522 A | 4/2009 |

(Continued)

OTHER PUBLICATIONS

Extended European Search Report for European Application No. 17905904.3 dated Jul. 11, 2019.

*Primary Examiner* — Duane N Taylor, Jr.
(74) *Attorney, Agent, or Firm* — Heslin Rothenberg Farley & Mesiti P.C.

(57) ABSTRACT

An optical biometric identification module, a display apparatus, and an electronic device, are provided. The optical biometric identification module includes an optical channel array panel configured to filter lights reflected by an organism; an optical chip configured to generate a biometric identification signal according to the filtered lights received by an optical sensing area of the optical chip; and a circuit board configured to transmit out the biometric identification signal. The optical chip is mounted on the circuit board, and the optical channel array panel is secured on the optical chip and covers at least the optical sensing area of the optical chip, to ensure that the lights received by the optical chip are approximately perpendicular to the optical channel array panel, thereby improving accuracy of the acquired biometric identification signal.

20 Claims, 4 Drawing Sheets

(51) Int. Cl.
*G06K 9/22* (2006.01)
*G06F 3/041* (2006.01)

(56) References Cited

U.S. PATENT DOCUMENTS

| | | | |
|---|---|---|---|
| 2016/0132712 A1 | 5/2016 | Yang et al. | |
| 2016/0254312 A1 | 9/2016 | Lee et al. | |
| 2016/0328595 A1 | 11/2016 | Sun et al. | |
| 2018/0075283 A1* | 3/2018 | You | H01L 27/14636 |
| 2018/0329560 A1* | 11/2018 | Kim | G06K 9/00006 |

FOREIGN PATENT DOCUMENTS

| | | |
|---|---|---|
| CN | 101512360 A | 8/2009 |
| CN | 101753212 A | 6/2010 |
| CN | 101799734 A | 8/2010 |
| CN | 102004339 A | 4/2011 |
| CN | 102111136 A | 6/2011 |
| CN | 102968217 A | 3/2013 |
| CN | 103458073 A | 12/2013 |
| CN | 203537424 U | 4/2014 |
| CN | 104463107 A | 3/2015 |
| CN | 105556443 A | 5/2016 |
| CN | 1055550664 A | 5/2016 |
| CN | 105676105 A | 6/2016 |
| CN | 205302331 U | 6/2016 |
| CN | 205484701 U | 8/2016 |
| CN | 106324395 A | 1/2017 |
| CN | 106339662 A | 1/2017 |
| CN | 106462765 A | 2/2017 |
| CN | 206515844 U | 9/2017 |
| WO | 2016119492 A1 | 8/2016 |
| WO | 2016133701 A1 | 8/2016 |
| WO | 2017095858 A1 | 6/2017 |

* cited by examiner

OPTICAL BIOMETRIC IDENTIFICATION MODULE, DISPLAY APPARATUS, AND ELECTRONIC DEVICE

CROSS REFERENCE TO RELATED APPLICATIONS

This disclosure is a continuation of International Application No. PCT/CN2017/088165, filed on Jun. 13, 2017, which application is hereby incorporated by reference herein, in its entirety.

TECHNICAL FIELD

The present application relates to the field of biometric identification technology, and more particularly, to an optical biometric identification module, a display apparatus, and an electronic device.

BACKGROUND

With the rapid development of biometric identification technology, the biometric identification technology of which the representative one is fingerprint identification has been widely adapted in various electronic devices, such as a mobile phone, a tablet computer, or the like. At present, the biometric identification technology adopted by most of the electronic devices available commercially is a capacitive fingerprint identification with a limited penetration thickness, influence from humidity of the fingers, and a requirement of a front-boring or thinning on the electronic device by which a better identification effect is ensured. Meanwhile, a fingerprint identification apparatus is generally placed centrally for the purpose of a better effect of the appearance. Therefore, increase in a screen-to-body ratio of the electronic device is limited when the fingerprint identification apparatus is placed in the front thereof.

At present, in order to increase the screen-to-body ratio, the electronic device may employ an optical fingerprint identification apparatus integrated under the screen thereof. However, the inventor has found there is also a problem that the optical fingerprint identification apparatus acquires the fingerprint image information by collecting the lights reflected by the finger and performing an identification on the collected reflected lights, wherein the fingerprint image information is acquired primarily by identifying respective minutiae of the fingerprint (ridges and valleys of the fingerprint). However, the lights reflected by the respective minutiae of the fingerprint may probably interfere therewith mutually, and the lights reflected by the fingerprint non-minutiae may also interfere with those reflected by the respective minutiae. Such interference with the lights reflected by the respective minutiae is the noise therein. Since the lights reflected by the respective minutiae contain noises, this will result in an error in the identification of the respective fingerprint minutiae, i.e., this will result in influence on the effect of the fingerprint identification.

SUMMARY

The objective of some embodiments of the present application is to provide an optical biometric identification module, a display apparatus, and an electronic device, which filters the noises in the lights reflected by an organism by using an optical channel array panel, thereby improving an accuracy of an acquired biometric identification signal.

In an embodiment of the present application, there is provided an optical biometric identification module, including an optical channel array panel configured to filter the lights reflected by an organism; an optical chip configured to generate a biometric identification signal according to the filtered lights received by an optical sensing area; and a circuit board configured to transmit out the biometric identification signal, the optical chip being mounted on the circuit board, and the optical channel array panel being secured on the optical chip and covering at least the optical sensing area of the optical chip.

In an embodiment of the present application, there is further provided a display apparatus, including a display screen; and the optical biometric identification module as described above, the optical biometric identification module being secured to the display screen, and an optical fingerprint identification module using at least part of pixel units of the display screen as a light source.

In an embodiment of the present application, there is further provided an electronic device including the display apparatus as described above.

In the present application in comparison with the prior art, the optical channel array panel capable of filtering the lights reflected by the organism is secured on the optical chip, so as to ensure that the lights received by the optical chip are approximately perpendicular to the optical channel array panel. That is, the optical channel array panel is used to filter the noises in the lights reflected by the organism, thereby improving the accuracy of the acquired biometric identification signal.

In addition, the optical channel array panel includes a light absorbing layer; and a plurality of optical channels located in the light absorbing layer, each of said optical channels being perpendicularly disposed on a contact surface between the optical chip and the optical channel array panel, and a sidewall thereof being cladding by the light absorbing layer. In the present embodiment, there is provided a physical structure of the optical channel array panel, so as to meet the requirements on practical design.

In addition, a ratio of a diameter of each of the optical channels to a thickness of the optical channel array panel is in a range between 1:5 and 1:20, and a resolution of the channel array panel is greater than or equal to 10 line pairs per millimeter. In the present embodiment, there is provided the specific ranges of the resolution of the optical channel array panel and of the ratio of the diameter of the optical channel to the thickness of the optical channel array panel.

In addition, the ratio of the diameter of each of the optical channels to the thickness of the optical channel array panel is 1:10. In the present embodiment, there is provided a preferred ratio of the diameter of the optical channel to the thickness of the optical channel array panel, thereby improving further the accuracy of the acquired biometric signal.

In addition, an optical transmittance of each optical channel is greater than 95%.

In addition, an optical transmittance of the light absorbing layer is less than or equal to 5%.

In addition, the optical channel array panel and the optical chip are encapsulated together. In the present embodiment, the optical channel array panel and the optical chip are encapsulated together, so as to facilitate the practical applications.

In addition, the optical chip includes a substrate; and a sensor wafer secured on the substrate, the substrate being mounted on the circuit board, and the sensor wafer being electrically connected to the circuit board through the substrate. In the present embodiment, there is provided a physical structure of the optical chip.

In addition, the optical biometric identification module is an optical fingerprint identification module.

BRIEF DESCRIPTION OF THE DRAWINGS

One or more embodiments are illustrated exemplarily by the diagrams in the accompanying drawings corresponding thereto, and those exemplary illustrations are not intended to limit the embodiments. The elements with the same reference numerals in the drawings indicate the like elements, unless specifically stated otherwise. The diagrams in the accompany drawings is not intended to be the limitation on scale.

DETAILED DESCRIPTION

For further clarifying the objectives, technical solutions, and advantages of the present application, some embodiments thereof will be further described in detail below in conjunction with the accompanying drawings and the embodiments. It should be understood that the specific embodiments described herein are merely used to explain the present application, rather than the limitation thereon.

The first embodiment of the present application relates to an optical biometric identification module applied to an electronic device, such as a mobile terminal device, e.g., a mobile phone, or a tablet computer, and other types of electronic devices, such as a card punch. The optical biometric identification module may be an optical fingerprint identification module. When it is applied to an electronic device without a display screen, a light source is required to be configured additionally. When it is applied to an electronic device with a display screen, it may be integrated thereunder, which facilitates an improvement of a screen-to-body ratio of the electronic device. Moreover, at least part of pixel units of the display screen can be used as the light source, without any requirement of the additionally configured light source.

More specifically, the display screen of the electronic device may be a Liquid Crystal Display (LCD) screen, an Organic Light Emitting Diode (OLED) display screen, a micro-Light Emitting Diode (micro-LED) display screen, or other types of flat panel display screen. When the electronic device is applied to a smart mobile terminal device, a touch display screen may be selected as the display screen in order to have functions of both a touch control and a displaying. For example, a touch sensor may be mounted on or integrated into the display screen. The optical fingerprint identification module may be integrated into the display screen by means of a structure of an Under display or an In display. For example, the optical fingerprint identification module for which a single discrete functional module may be utilized may be directly disposed under the display area of the display screen, such that it can integrate and reuse some of the functions of the display screen (such as a utilization of the self-luminescent display pixels of the display screen as the light source, etc.).

Figure 1:
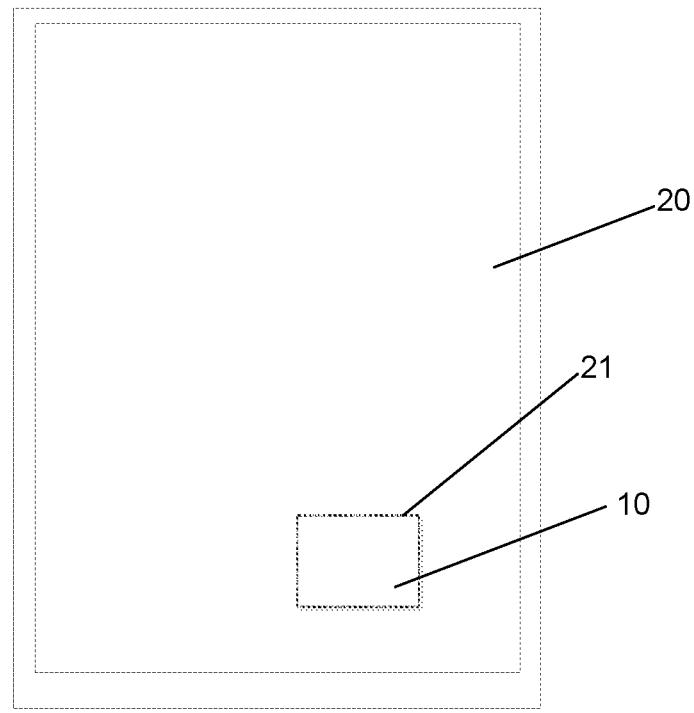
FIG. 1 is a schematic diagram of structure of an electronic device according to a first embodiment of the present application.

In this embodiment, an illustration is made by taking an example where the optical biometric identification module which is the optical fingerprint identification module is applied to the electronic device with the display screen. Referring to FIG. 1, an optical biometric identification module 10 with an optical sensing area 21 is mounted under a display screen 20. The optical biometric identification module 10 uses a part of the pixel units of the display screen 20 as a light source, where the pixel units which serve as the light source cover at least the optical sensing area 21. When there is a touch by an organism on the area of the display screen 20 above the optical sensing area 21, the pixel units which serve as the light source emit the lights to illuminate the organism. The organism receives the lights emitted from the light source before reflection thereof by which the lights reflected by the organism are generated. In the present embodiment, the organism may be a finger. When the lights emitted by the pixel units illuminate onto the finger, both of the fingerprint minutiae and non-minutiae on the finger generate emission, resulting in corresponding reflected lights.

Figure 2:
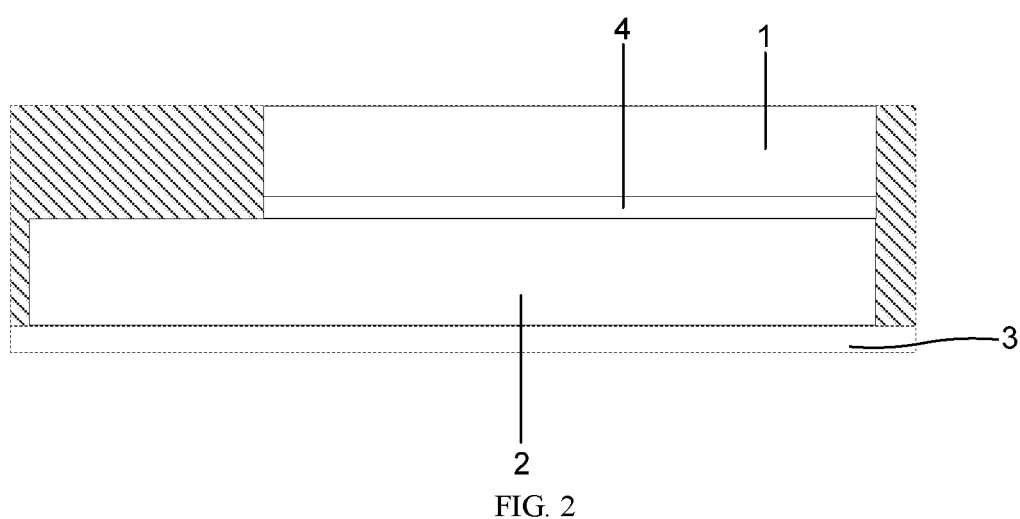
FIG. 2 is a schematic diagram of structure of a biometric identification module according to the first embodiment of the present application.

Referring to FIG. 2, in the present embodiment, the optical biometric identification module 10 includes an optical channel array panel 1, an optical chip 2, and a circuit board 3.

The optical channel array panel 1 is configured to filter the lights reflected by an organism, for example, a finger, in order to ensure that the noises in the filtered lights are weak enough, while there is a requirement of certain light transmittance. The optical chip 2 is configured to generate a biometric identification signal according to the filtered lights received by the optical sensing area 21. The circuit board 3 is configured to transmit out the biometric identification signal. In the present embodiment, the biometric identification signal herein may be considered to be fingerprint image information, but is not limited thereto.

Referring to FIG. 2, the optical chip 2 is mounted on the circuit board 3. Specifically, it may be mounted on the circuit board 3 in a manner of soldering. The optical channel array panel 1 is secured on the optical chip 2, and covers at least the optical sensing area 21 thereof, where the optical channel array panel 1 may be secured on the optical chip 2 by virtue of a transparent adhesive film 4 which achieves a bonding function and is of a transparent material. The higher the light transmittance of the transparent adhesive film 4 is, the less the influence on the lights is. The transparent adhesive film 4 may be made of an organic material such as silica gel, a resin, and/or the like.

The optical channel array panel 1 belongs to an optical transmission element capable of filtering the noises in the lights reflected by the organism while transmitting the light reflected thereby, i.e., enabling the filtered lights, reflected by the organism, as received by the optical chip 2 by means of the optical sensing region 21 to be approximately perpendicular to the optical channel array panel 1. A biometric identification signal, for example, fingerprint image information, is generated by the optical chip 2 according to the filtered lights, and transmitted into a processor of the electronic device through the circuit board 3, so as to be further processed subsequently.

In the present embodiment herein, the optical channel array panel 1 and the optical chip 2 are encapsulated together, so as to form a single integrated element. The encapsulation manner may be a plastic encapsulation. Referring to FIG. 2, the portions with slashed shadows therein indicate the materials for plastic encapsulation, but is not limited thereto. The optical channel array panel 1 and the optical chip 2 may also be discrete elements of which both are bonded together by virtue of the transparent adhesive film 4.

In the present embodiment in comparison with the prior art, the optical channel array panel capable of filtering the lights reflected by the organism is secured on the optical chip, so as to ensure that the lights received by the optical chip is approximately perpendicular to the optical channel array panel. That is, the optical channel array panel is used to filter the noises in the lights reflected by the organism, thereby improving the accuracy of the acquired biometric identification signal.

The second embodiment of the present application relates to an optical biometric identification module. The present embodiment is an elaboration of the first embodiment, and the substantial elaboration in the present embodiment lies in that the optical channel array panel 1 includes a light absorbing layer 11, and a plurality of optical channels 12 located in the light absorbing layer 11.

Figure 3:
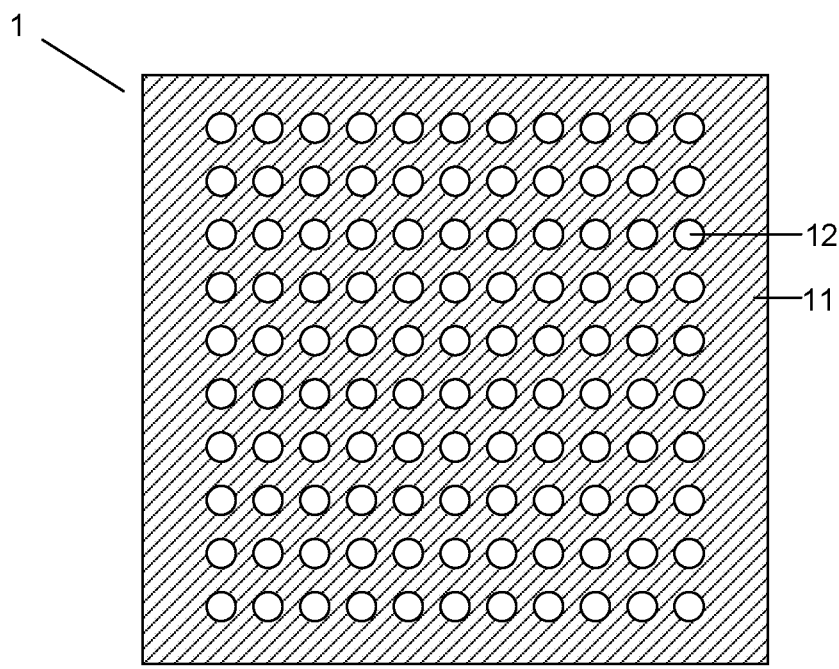
FIG. 3 is a top view of an optical channel array panel according to a second embodiment of the present application.
Figure 4:
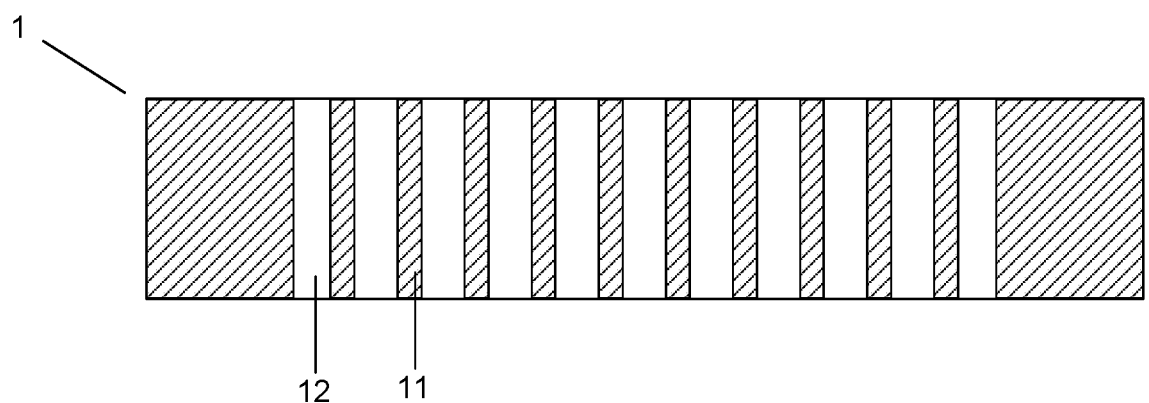
FIG. 4 is a cross-sectional view of the optical channel array panel according to the second embodiment of the present application.

In the present embodiment, referring to FIGS. 3 and 4 which are the top view and the cross-sectional view of the optical channel array panel 1 respectively, the optical channel array panel 1 includes the light absorbing layer 11, and the plurality of optical channels 12 located therein, which are formed of materials with high light transmittances, for example, but not limited to, a glass. Preferably, the optical transmittance of the optical channel 12 is greater than 95%. The plurality of optical channels 12 are arranged regularly in the light absorbing layer 11 per a certain spacing. For example, the respective spacing between the plurality of optical channels 12 are kept to be equal so as to achieve a uniform arrangement, but are not limited thereto. In addition, the respective optical channels 12 are perpendicularly disposed on a contact surface between the optical chip 2 and the optical channel array panel 1, which corresponds to an arrangement in which there is disposed in the optical channel array panel 1 a plurality of light transmitting channels of which each is perpendicular to the contact surface between the optical chip 2 and the optical channel array panel 1, so that the lights that are perpendicularly incident into the optical channel array panel 1 can travel therethrough. Herein, a sidewall of each of the optical channels 12 is cladded by the light absorbing layer 11.

In the present embodiment, the light absorbing layer 11 is composed of a light-absorbing material. As can be seen from FIG. 3, the light absorbing material is filled between the respective optical channels 12 to form a monolithic structure, that is, the respective optical channels 12 and the light absorbing layer 11 form an integrated structure. Such an implementation is not intended to be any limitation on the manner in which the light absorbing layer 11 and the respective optical channels 12 are combined, as long as the light absorbing layer 11 is able to clad the sidewalls of the respective optical channels 12 to absorb the noises. Herein, the light absorbing material may be a black glass or other materials having high absorption and low light transmittance with respect to light. Preferably, the optical transmittance of the light absorbing layer is less than or equal to 5%.

It is to be noted that a shape of the optical channel 12 in FIG. 3 (a top view of the optical channel array panel 1) is a circle, but not limited thereto, and the optical channel 12 may also be in other shapes, such as a square, a rectangle, a triangle, or the like, but the present embodiment is not intended to be any limitation thereon.

Figure 5:
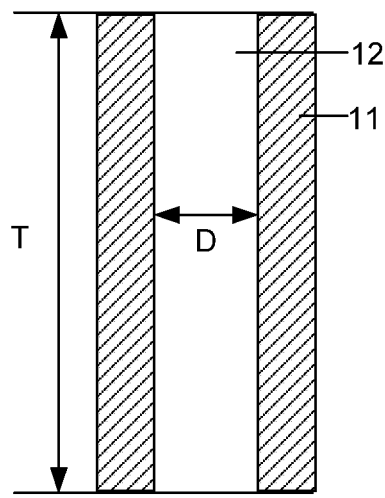
FIG. 5 is a partial schematic diagram of the optical channel array panel according to the second embodiment of the present application.

Referring to FIG. 4, a resolution of the optical channel array panel 1 is greater than or equal to 10 line pairs per millimeter. Herein, the term line pairs per millimeter which is a unit of resolution refers to the number of line pairs within one millimeter that can be discerned by an instrument. Usually, the more line pairs the instrument can discern, the higher the resolution of the instrument is. Referring to FIG. 5, which is a partial diagram of the optical channel array panel 1, a ratio of a diameter D of each of the optical channels 12 to a thickness T of the optical channel array panel 1 is in a range between 1:5 and 1:20.

Preferably, the ratio of the diameter D of each of the optical channels 12 to the thickness T of the optical channel array panel 1 is 1:10. However, this embodiment is not intended to be any limitation thereon, and such ratio may be set according to practical usage and effect.

It is to be noted that the arrangement of the optical channels 12 in the optical channel array panel 1 is only schematically depicted in FIG. 4. However, the present embodiment is not intended to be any limitation thereon, and the arrangement may be set according to the design requirements of the optical biometric identification module 10.

In the present embodiment, the optical channels 12 are perpendicularly disposed on the contact surface between the optical chip 2 and the optical channel array panel 1. When the pixel units, which serve as the light source, in the display screen 20 emit lights to illuminate the organism (a finger is taken as an example), the fingerprint minutiae and non-minutiae will both generate reflections. Herein, most of the lights reflected by the respective fingerprint minutiae are perpendicularly incident into the optical channel array panel 1, but there is also a minority of the lights that will be scattered outwardly during the transmission process, resulting in an oblique incidence into the optical channel array panel 1. The lights reflected by the fingerprint non-minutiae are also obliquely incident into the optical channel array panel 1. Herein, an illustration is made by taking one fingerprint minutia as an example. The lights reflected by this fingerprint minutia, which refers to the lights approximately perpendicular with respect to the optical channel array panel 1 herein, are mixed with the lights scattered from other fingerprint minutia and the lights reflected by the fingerprint non-minutiae, i.e., the lights with oblique angles relative to the optical channel array panel 1. When the light reflected by this fingerprint minutia travels through the optical channel 12 in the optical channel array panel 1, the optical channel 12 allows only the lights that is approximately perpendicularly incident into the optical channel array panel 1 from among the lights reflected by this fingerprint minutia to travel therethrough, whereas the lights with oblique angles relative to the optical channel array panel 1 mixed in the lights reflected by this fingerprint minutia are absorbed (the lights with oblique angles will be projected onto the sidewalls of the optical channels 12 so as to be absorbed by the light absorbing layer), since the optical channel 12 is perpendicular with respect to the optical chip 2 and the external portion thereof is cladded with the light absorbing layer 11. That is, the optical chip 2 can receive only the lights approximately perpendicular to the optical channel array panel 1.

In the present embodiment, the optical channel array panel 1 can withstand a high temperature of 260° C., will not undergo deformation or discoloration thereat, and its optical performance is not affected at all.

In the present embodiment in comparison with the first embodiment, there is provided the physical structure of the optical channel array panel to meet the practical design requirements.

The third embodiment of the present application relates to an optical biometric identification module. The present embodiment is a elaboration of the first embodiment, and the substantial elaboration in the present embodiment lies in that the optical chip 2 includes a substrate 22 and a sensor wafer 23.

Figure 6:
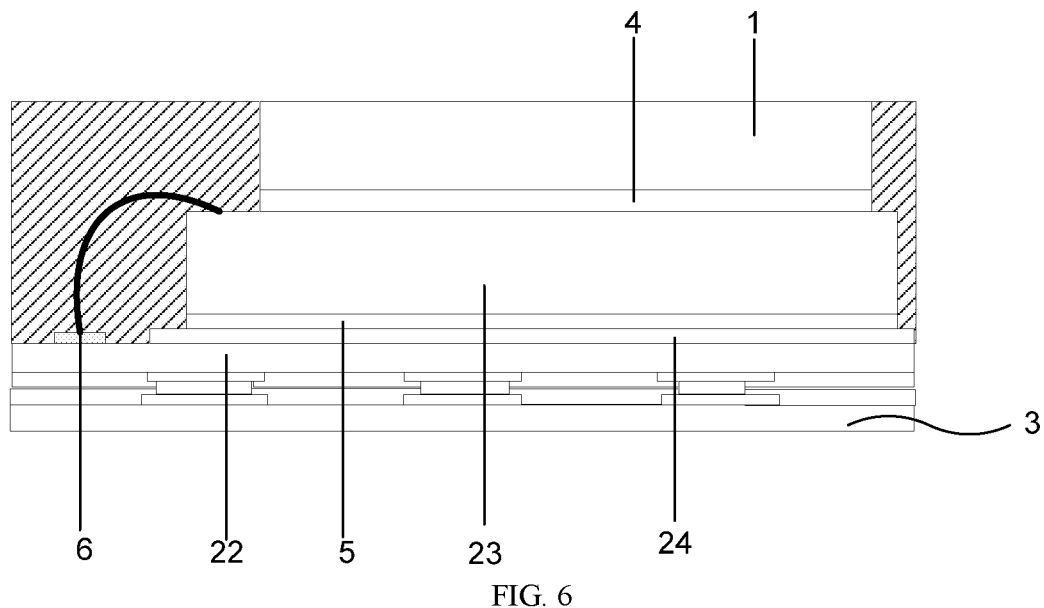
FIG. 6 is a schematic diagram of structure of a biometric identification module according to a third embodiment of the present application.

Referring to FIG. 6, the sensor wafer 23 is secured on the substrate 22, and a specific securing manner may be such that it is secured on the substrate 22 by virtue of the transparent adhesive film 4. The substrate 22 is mounted on the circuit board 3, and specifically, may be mounted on the circuit board 3 in a manner of soldering.

The sensor wafer 23 is secured to the optical channel array panel 1 by virtue of another transparent adhesive film 5. Referring to FIGS. 1 and 6, an optical sensing area 21 is formed on the contact surface between the sensor wafer 23 and the optical channel array panel 1. The sensor wafer 23 is connected to the substrate 22 through a gold wire 6, and is electrically connected to the circuit board 3 through the substrate 22. The optical sensing area 21 of the sensor wafer 23 receives the lights, reflected by the organism, as filtered by the optical channel array panel 1, and generates a biometric identification signal according to those lights. Such biometric identification signal is transmitted to the substrate 22 through the gold wire 6, and transmitted to the circuit board 3 through the substrate 22 (the circuit board 3 is connected to a processor of the electronic device, and that biometric identification signal is transmitted to the processor of the electronic device through the circuit board 3).

In the present embodiment, referring to FIG. 6, the optical chip 2 further includes a solder mask 24 which is coated on the substrate 22 and faces the transparent adhesive film 4. The solder mask 24 can protect the circuits on the substrate 22 and prevent them from oxidation.

In the present embodiment in comparison with the first embodiment, there is provided the physical structure of the optical chip. It is to be noted that, the present embodiment may also serve as an elaboration of the second embodiment, and achieve the same technical effect.

The fourth embodiment of the present application relates to a display apparatus applied to an electronic device, such as a mobile phone, a tablet computer, and the like. The display apparatus includes a display screen 20 and the optical biometric identification module 10 in any one of the first to third embodiments.

Figure 7:
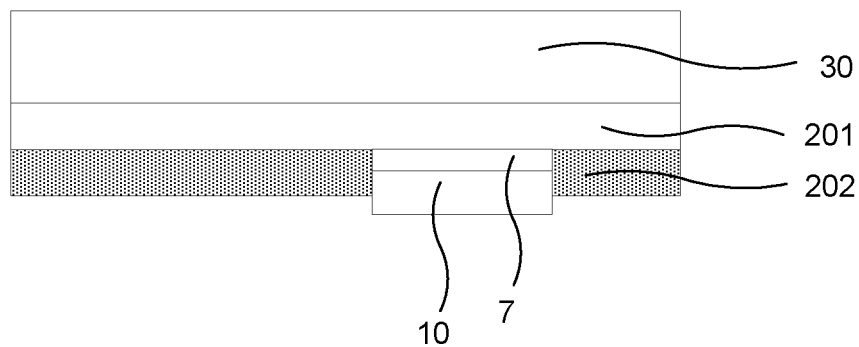
FIG. 7 is a schematic diagram of structure of a display apparatus according to a fourth embodiment of the present application.

Referring to FIGS. 1 and 7, the optical biometric identification module 10 is secured to the display screen 20. Specifically, the display screen 20 includes a self-luminescent layer 201 and an opaque layer 202. An aperture is disposed on the opaque layer 202. The optical biometric identification module 10 is secured in the aperture of the opaque layer 202 of the display screen 20, and is secured to the self-luminescent layer 201 of the display screen 20 by virtue of one transparent adhesive film 7 or other adhesive materials with high transmittances. Moreover, at the time of securing, it is required that the cleanness in the aperture of the opaque layer 202 is guaranteed, and there are no substance such as foreign matter, dirt, dust, or the like that may affect the light transmission, so as to prevent the optical biometric identification module 10 from being affected by the foreign matter when receiving the light reflected by the organism. The optical biometric identification module 10 may use at least part of the pixel units of the display screen 20 as a light source, that is, the optical biometric identification module 10 uses at least part of the pixel units of the self-luminescent layer 201 of the display screen 20 as a light source, and an area of the pixel units in the self-luminescent layer 201 used by the optical biometric identification module 10 covers at least the optical sensing area 21.

In the present embodiment, a size of the aperture of the opaque layer 202 is set according to a dimension of the optical biometric identification module 10 and layout requirements of the entire apparatus, and this embodiment is not intended to be any limitations thereon, but it is necessarily guaranteed that the optical biometric module 10 can receive the lights reflected by the organism.

The display apparatus further includes a panel 30 mainly made of a photic material such as a glass, which can ornament the appearance while protecting the display screen 20 and functioning as a support surface of the display screen 20.

Figure 8:
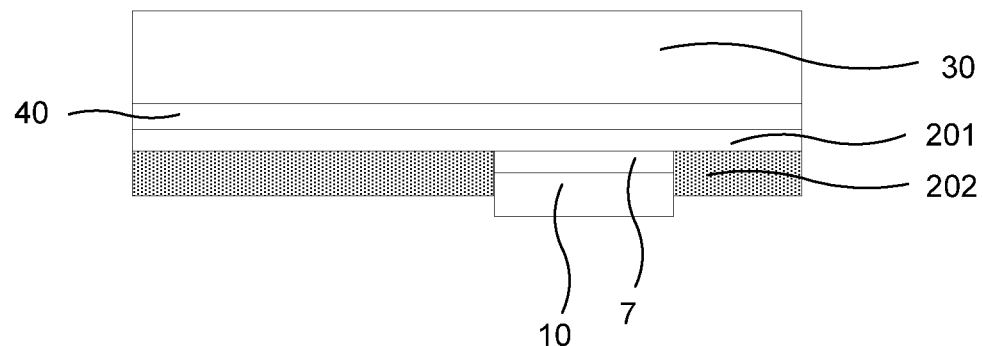
FIG. 8 is a schematic diagram of structure of a display apparatus including a touch sensor according to the fourth embodiment of the present application.

Preferably, referring to FIGS. 1 and 8, the display apparatus further includes a touch sensor 40 which mounted on or integrated in the display screen 20 (in figures, the touch sensor 40 is mounted between the self-luminescent layer 201 of the display screen 20 and the panel 30, but not limited thereto, and may also be integrated in the self-luminescent layer 201 of the display screen 20) and covers at least the optical sensing area 21.

The touch sensor 40 is configured to inform the processor to activate the optical biometric identification module 10 when there is detected a touch by an organism on an area of the display screen 20 above the optical sensing area 21, so that the optical biometric module 10 is activated to complete the biometric identification only upon receiving the touch by the organism when the electronic device is in a screen-off state. Preferably, the display screen 20 may be controlled to display one dark prompting picture (a picture that is dark but visible to the naked eye) at an area corresponding to the optical sensing area 21, so as to facilitate an accurate positioning of the optical sensing area 21 by the user.

In the present embodiment in comparison with the prior art, the optical channel array panel capable of filtering the lights reflected by the organism is secured on the optical chip, so as to ensure that the lights received by the optical chip are approximately perpendicular to the optical channel array panel. That is, the optical channel array panel is used to filter the noises in the lights reflected by the organism, thereby improving the accuracy of the acquired biometric identification signal. Meanwhile, the processor is informed to activate the optical biometric identification module only when the touch by the organism is received, so the power consumption is reduced.

The fifth embodiment of the present application relates to an electronic device, such as a mobile phone, a tablet computer, and the like. The electronic device includes the display apparatus in the fourth embodiment.

In the present embodiment in comparison with the prior art, the optical channel array panel capable of filtering the lights reflected by the organism is secured on the optical chip, so as to ensure that the lights received by the optical chip are approximately perpendicular to the optical channel array panel. That is, the optical channel array panel is used to filter the noises in the lights reflected by the organism, thereby improving the accuracy of the acquired biometric identification signal.

As will be understood by a person of ordinary skill in the art, the above various embodiments are specific embodiments for implementing the present application, and various changes in form and detail can be made without departing from the spirit and scope of the present application in practical applications.

What is claimed is:

1. An optical biometric identification module, comprising:
   an optical channel array panel configured to filter lights reflected by an organism;
   an optical chip configured to generate a biometric identification signal according to the filtered lights received by an optical sensing area of the optical chip; and
   a circuit board configured to transmit out the biometric identification signal;
   the optical chip being mounted on the circuit board, and the optical channel array panel being secured on the optical chip and covering at least the optical sensing area of the optical chip;
   wherein the optical channel array panel comprises:
   a plurality of optical channels; and
   a light-absorbing material that is filled between the optical channels;
   the plurality of optical channels and the light-absorbing material form an integrated structure;
   wherein the optical channel array panel is secured on the optical chip by virtue of a transparent adhesive film;
   wherein the organism is a human body.

2. The optical biometric identification module according to claim 1, wherein the light-absorbing material forms a light absorbing layer and the plurality of optical channels located in the light absorbing layer;
   each of said optical channels being perpendicularly disposed on a contact surface between the optical chip and the optical channel array panel, and a sidewall thereof being cladded by the light absorbing layer.

3. The optical biometric identification module according to claim 2, wherein a ratio of a diameter of each of said optical channels to a thickness of the optical channel array panel is in a range between 1:5 and 1:20, and a resolution of the channel array panel is greater than or equal to 10 line pairs per millimeter.

4. The optical biometric identification module according to claim 3, wherein the ratio of the diameter of each of said optical channels to the thickness of the optical channel array panel is 1:10.

5. The optical biometric identification module according to claim 2, wherein an optical transmittance of each of said optical channels is greater than 95%.

6. The optical biometric identification module according to claim 2, wherein an optical transmittance of the light absorbing layer is less than or equal to 5%.

7. The optical biometric identification module according to claim 1, wherein the optical channel array panel and the optical chip are encapsulated together.

8. The optical biometric identification module according to claim 1, wherein the optical chip comprises a substrate and a sensor wafer secured on the substrate;
   the substrate is mounted on the circuit board; and
   the sensor wafer is electrically connected to the circuit board through the substrate.

9. The optical biometric identification module according to claim 1, wherein the optical biometric identification module is an optical fingerprint identification module.

10. A display apparatus, comprising: a display screen and an optical biometric identification module;
    the optical biometric identification module being secured to the display screen, and the optical biometric identification module uses at least part of the pixel units of the display screen as a light source;
    wherein the optical biometric identification module comprises: an optical channel array panel configured to filter the lights reflected by an organism; an optical chip configured to generate a biometric identification signal according to the filtered lights received by an optical sensing area; and a circuit board configured to transmit out the biometric identification signal;
    the optical chip being mounted on the circuit board, and the optical channel array panel being secured on the optical chip and covering at least the optical sensing area of the optical chip;
    wherein the optical channel array panel comprises:
    a plurality of optical channels; and
    a light-absorbing material that is filled between the optical channels;
    the plurality of optical channels and the light-absorbing material form an integrated structure:
    wherein the optical channel array panel is secured on the optical chip by virtue of a transparent adhesive film;
    wherein the organism is a human body.

11. The display apparatus according to claim 10, wherein the optical biometric identification module is secured in an aperture of an opaque layer of the display screen.

12. The display apparatus according to claim 11, wherein the display apparatus further comprises a touch sensor configured to inform a processor to activate the optical biometric identification module when there is detected a touch by the organism on the optical sensing area, the touch sensor being mounted on or integrated in the display screen, and the touch sensor covering at least the optical sensing area.

13. An electronic device, comprising: a display screen and an optical biometric identification module arranged under the display screen;
    wherein the optical biometric identification module comprises: an optical channel array panel configured to filter the lights reflected by an organism; an optical chip configured to generate a biometric identification signal according to the filtered lights received by an optical sensing area; and a circuit board configured to transmit out the biometric identification signal;
    the optical chip being mounted on the circuit board, and the optical channel array panel being secured on the optical chip and covering at least the optical sensing area of the optical chip;
    wherein the optical channel array panel comprises:
    a plurality of optical channels; and
    a light-absorbing material that is filled between the optical channels;
    the plurality of optical channels and the light-absorbing material form an integrated structure:
    wherein the optical channel array panel is secured on the optical chip by virtue of a transparent adhesive film;
    wherein the organism is a human body.

14. The electronic device according to claim 13, wherein the light-absorbing material forms a light absorbing layer and the plurality of optical channels located in the light absorbing layer;

each of said optical channels being perpendicularly disposed on a contact surface between the optical chip and the optical channel array panel, and a sidewall thereof being cladded by the light absorbing layer.

15. The electronic device according to claim 14, wherein a ratio of a diameter of each of said optical channels to a thickness of the optical channel array panel is in a range between 1:5 and 1:20, and a resolution of the channel array panel is greater than or equal to 10 line pairs per millimeter.

16. The electronic device according to claim 15, wherein the ratio of the diameter of each of said optical channels to the thickness of the optical channel array panel is 1:10.

17. The electronic device according to claim 14, wherein an optical transmittance of each of said optical channels is greater than 95%.

18. The electronic device according to claim 14, wherein an optical transmittance of the light absorbing layer is less than or equal to 5%.

19. The electronic device according to claim 13, wherein the optical channel array panel and the optical chip are encapsulated together.

20. The electronic device according to claim 13, wherein the optical chip comprises a substrate and a sensor wafer secured on the substrate;
the substrate being mounted on the circuit board;
the sensor wafer being electrically connected to the circuit board through the substrate.

* * * * *